Aug. 8, 1933.  O. J. HORGER  1,921,884
INTERCHANGEABLE JOURNAL BOX
Filed Sept. 21, 1931  4 Sheets-Sheet 1

INVENTOR.
Oscar J. Horger,
by Carl Han Gravely
HIS ATTORNEYS.

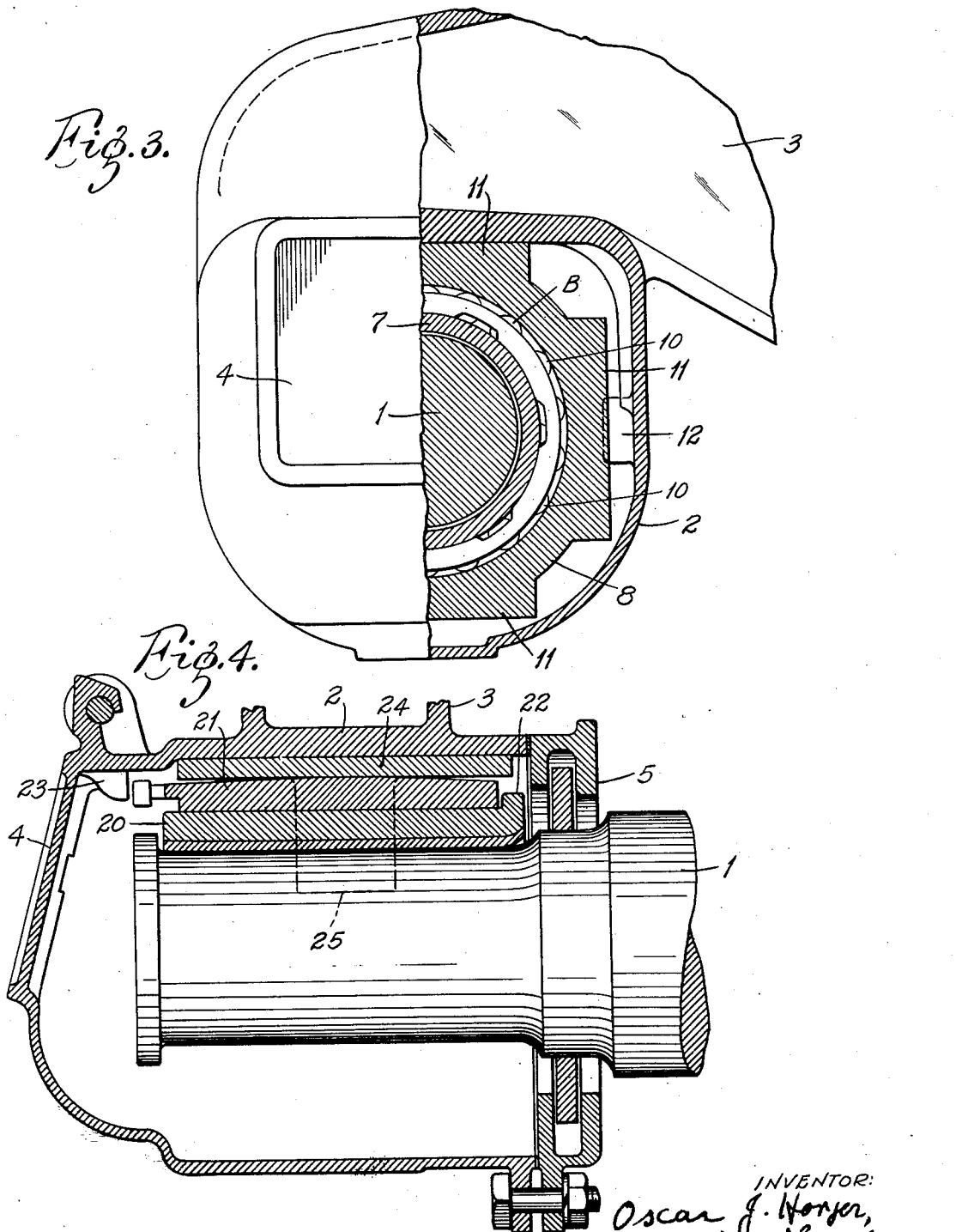

Aug. 8, 1933.   O. J. HORGER   1,921,884
INTERCHANGEABLE JOURNAL BOX
Filed Sept. 21, 1931   4 Sheets-Sheet 3
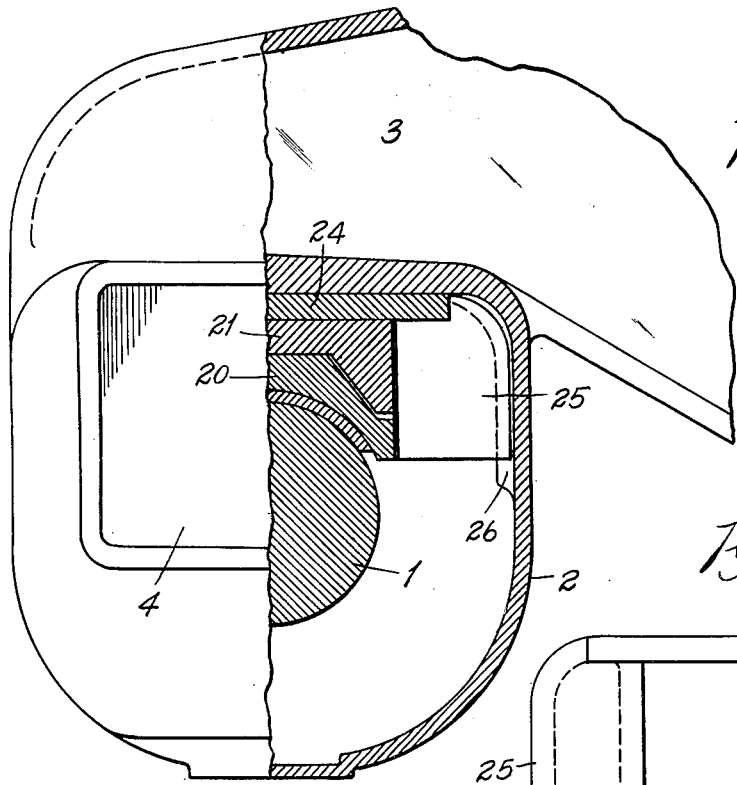
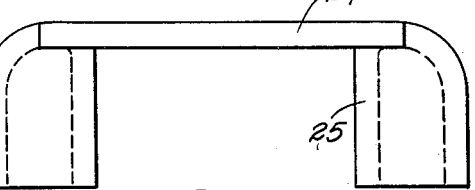
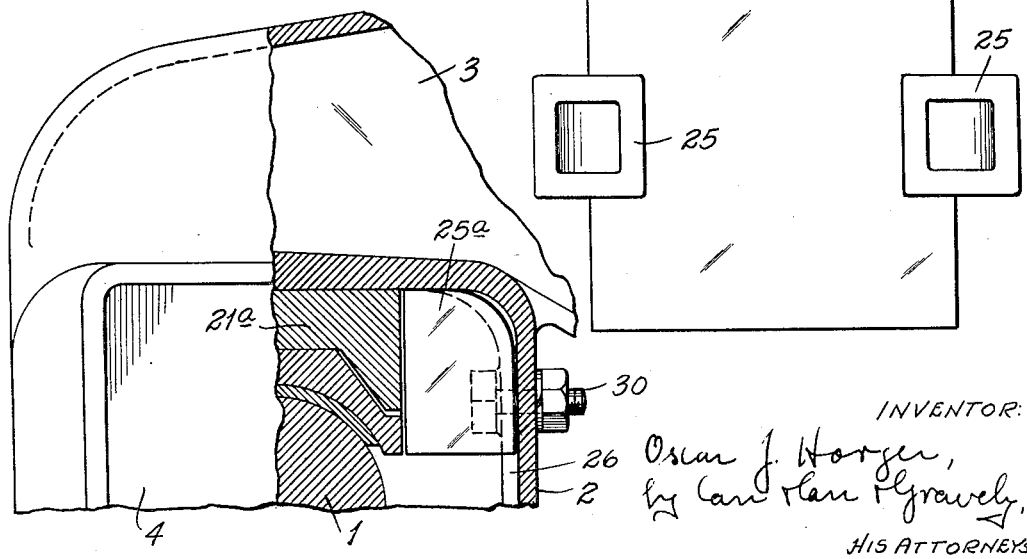

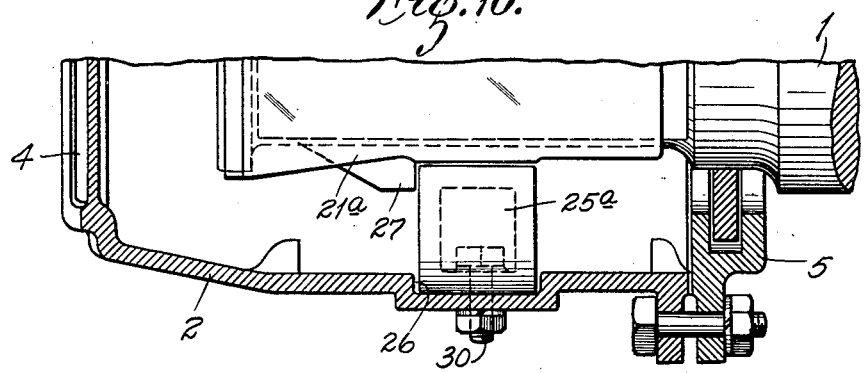
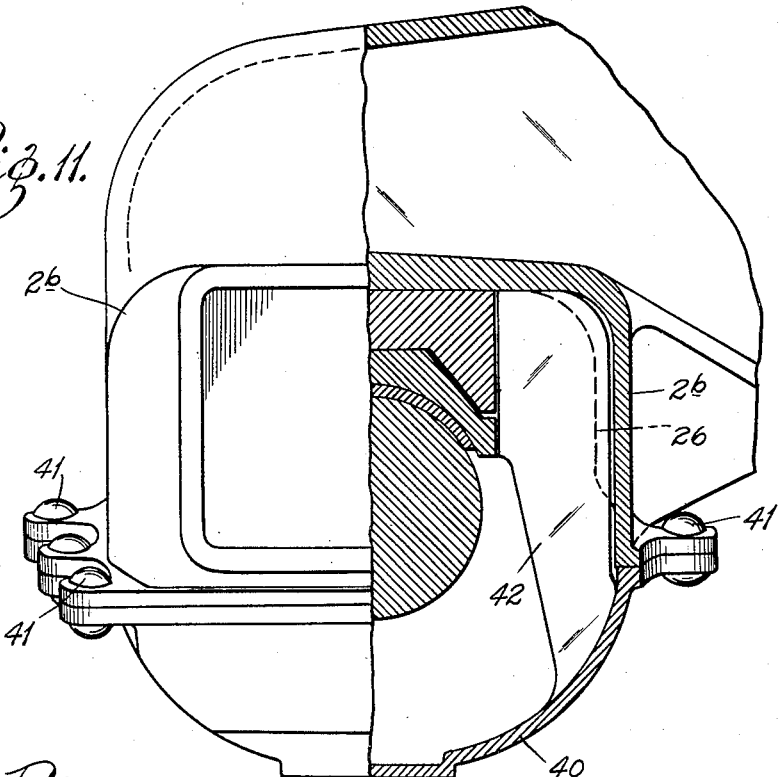
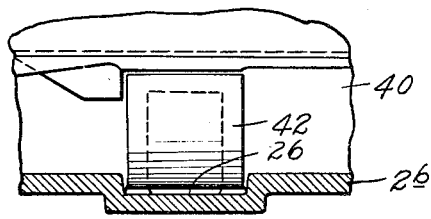

Patented Aug. 8, 1933

1,921,884

UNITED STATES PATENT OFFICE 1,921,884

INTERCHANGEABLE JOURNAL BOX

Oscar J. Horger, Canton, Ohio, assignor to The Timken Roller Bearing Company, Canton, Ohio, a Corporation of Ohio Application September 21, 1931
Serial No. 563,915

5 Claims. (Cl. 308—35)

My invention relates to interchangeable journal boxes, that is, journal boxes adapted to receive roller bearings and also the usual A. R. A. or other standard plain bearings. The invention has for its principal object a simple and economical interchangeable construction.

The invention consists principally in omitting the projections usually provided for cooperation with plain bearings and in providing the inner walls of the journal boxes with recesses adapted to removably receive members for cooperating with standard plain bearings and also providing the inner walls of said journal boxes with portions adapted to cooperate with roller bearing members without interfering with the plain bearing members. The invention further consists in the interchangeable journal box and in the parts and combinations and arrangements of parts hereinafter described and claimed.

Figure 1:
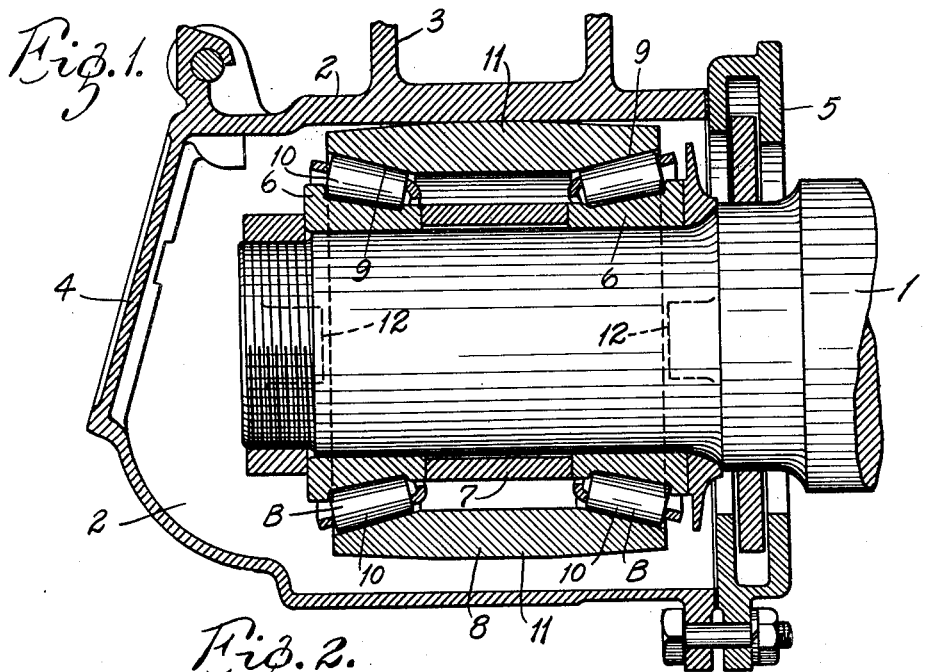
Figure 2:
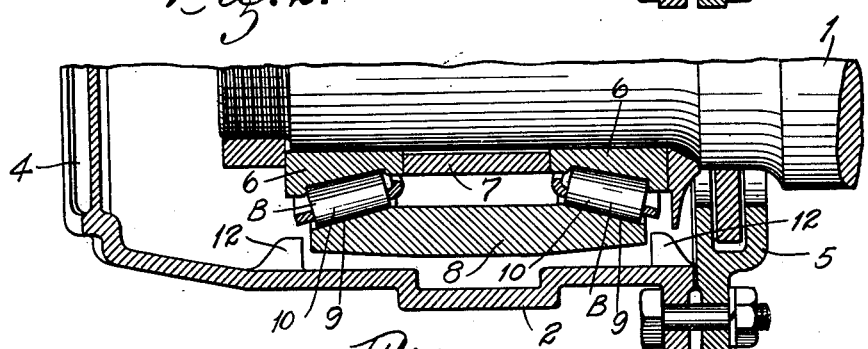
Figure 5:
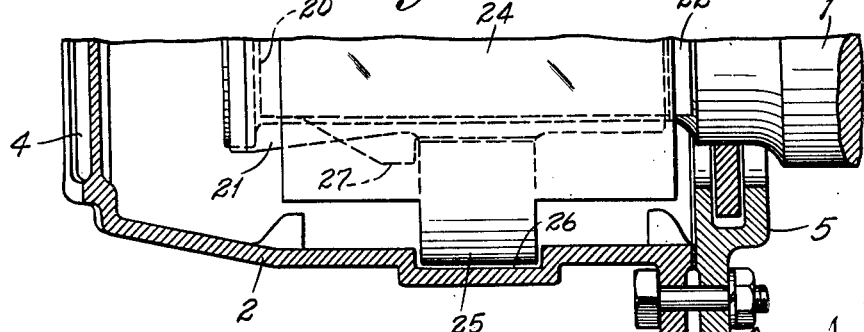

In the accompanying drawings:

Fig. 1 is a vertical sectional view of a journal box construction embodying my invention, illustrating taper roller bearings, Fig. 2 is a part horizontal sectional view of the construction shown in Fig. 1, Fig. 3 is a part end view, part vertical cross sectional view, Fig. 4 is a vertical longitudinal sectional view similar to Fig. 1, showing plain bearings, Fig. 5 is a horizontal sectional view similar to Fig. 2, showing plain bearings, Fig. 6 is a part end view, part vertical cross sectional view similar to Fig. 3, showing plain bearings, Figs. 7 and 8 are a side elevation and bottom plan view, respectively, of a yoke member used with plain bearings, Fig. 9 is a part end view, part sectional view similar to Fig. 6, showing a modification of the adapter device for use in connection with plain bearings, Fig. 10 is a sectional view similar to Fig. 5 showing said modified adapter device, Fig. 11 is a part end view, part vertical cross sectional view similar to Figs. 6 and 9 showing another modified form of adapter device for use with plain bearings, and Fig. 12 is a fragmentary horizontal sectional view showing, in plan, the relation between said modified tapered member and the plain bearings.

In the construction shown in Figs. 1 to 10 inclusive, a railway car axle 1 extends into a journal box 2 of the type formed integral with a portion 3 of the truck side frame. The inside of the journal box is large enough to receive roller bearings and is free from the internal projections on its side walls required for cooperation with plain bearings. A suitable cover plate 4 is provided for the outer end of the journal box and a suitable closure ring 5 for the inner end of the journal box.

Figs. 1 to 3 show the axle provided with roller bearings B including two inner bearing members or cones 6 separated by a spacer sleeve 7, a one-piece cup or outer bearing member 8 provided with conical race portions 9 in each end and a series of conical rollers 10 between each bearing cone 6 and the corresponding race portion 9 of said cup 8.

The bearing cup is preferably provided with an enlarged panel portion 11 that rests against the undersurface of the top of the journal box 2 and is preferably convexly curved from end to end to permit rocking movement thereof in the journal box. A plurality of these enlarged portions 11 are shown in the drawings permitting turning of the cup to distribute the wear thereon. In order to permit limited longitudinal movement of the axle and bearings with respect to the journal box, each side wall of the journal box is provided with stop lugs 12 that are spaced apart a distance somewhat greater than the overall length of said bearing cup 8. As shown in the drawings these stops 12 are preferably located about level with the axis of the axle so as to act on diametrically opposite portions of the cup 8.

When plain bearings of the usual A. R. A. or other type are substituted for the roller bearings, (as illustrated in Figs. 4 to 8 inclusive) the usual bearing member or "brass" 20 is placed on top of the axle and over it is placed the standard wedge 21. The bearing member is provided with an upstanding flange 22 at its inner end adjacent to the inner end of said wedge 21 and the journal box 2 has the usual lug 23 depending from its undersurface near the outer end of said wedge 21. Mounted over the wedge 21 and bearing member 20 is a saddle or yoke member 24, whose upper surface fits the undersurface of the top of the journal box 2 and whose depending arm portions 25 are held in recesses 26 provided in the sides of the journal box. The bearing member 20 has projecting lugs 26 adapted to abut against the faces of said yoke arms 25 toward the inner end of the journal box. The cooperation between these parts is the same as between said plain bearings and the integral internal projections heretofore provided in journal boxes.

By the above described arrangement, it will be noted that the journal box accommodates a standard plain bearing construction and permits the usual movement of several parts relative to each other; and at the same time, that it will accommodate roller bearings of usual design, requiring no special construction of outer bearing member or housing.

In the modified construction shown in Figs. 9 and 10, the wedge 21a abuts directly against the undersurface of the journal box top. Instead of a complete yoke or saddle, separate blocks 25a are disposed in the journal box recesses and secured to the journal box as by bolts 30.

In the modified construction shown in Figs. 11 and 12, is shown a journal box wherein the lower portion 40 is separate from the upper portion 2b and secured thereto by bolts 41. When plain bearings are used, a special lower journal box portion 40 is provided with upstanding projections 42 that fit in the recesses 26 in the side walls of the upper portion of the journal box 2 after the fashion of the separate blocks 25a of Fig. 9 or the yoke of Fig. 6. When roller bearings are used a lower journal box portion is provided omitting these projections and the roller bearing construction will be similar to that shown in Figs. 1 to 3. If desired, the outer bearing member may be of generally cylindrical shape, conforming to usual roller bearing practice, instead of having the raised or enlarged panel portions 11.

The above described construction has the important advantage of accommodating roller bearing members, or housings conforming to usual roller bearing practice; the omission of the usual internal journal box projections making it unnecessary to provide said bearing member with seats or recesses to receive said projections. Besides reducing the expense of making the roller bearings, this arrangement has the further advantage of facilitating assembling of the axle and bearings in the journal box. The several forms of adapter members may be easily and economically installed and they will cooperate with present standard A. R. A. or other plain bearings in the same way as the integral internal projections now commonly provided in journal boxes.

What I claim is:

1. An interchangeable journal box construction comprising a journal box adapted to receive roller bearings and provided with vertically extending depressions in its sides and adapter members mounted in said depressions, said adapter members being shaped for engagement with plain bearings and being removable to permit said box to accommodate roller bearings.

2. An interchangeable journal box comprising side walls having vertically extending depressions therein and adapter members mounted in said depressions for cooperating with plain bearings, said adapter members being removable to permit said box to accommodate roller bearings.

3. An adapter for converting roller bearing journal boxes into plain bearing journal boxes, comprising arms adapted to be mounted against the sides of said boxes for cooperation with plain bearings.

4. A journal box construction comprising an upper portion adapted to receive either plain bearings or roller bearings and a removable lower portion having members projecting into said upper portion to cooperate with plain bearings.

5. An interchangeable journal box construction comprising an upper journal box member and a separable lower journal box member, said lower member having arms extending into said upper member for cooperation with plain bearings.

OSCAR J. HORGER.